(12) United States Patent
Rose et al.

(10) Patent No.: US 11,763,687 B2
(45) Date of Patent: Sep. 19, 2023

(54) SURVEY-AUGMENTED NAVIGATION SYSTEM FOR AN AIRCRAFT

(71) Applicant: Reliable Robotics Corporation, Mountain View, CA (US)

(72) Inventors: Robert W. Rose, Los Altos, CA (US); Matthew T. Nehrenz, San Jose, CA (US); John P. Couluris, Mountain View, CA (US); Juerg Frefel, Cupertino, CA (US)

(73) Assignee: Reliable Robotics Corporation, Mountain View, CA (US)

( * ) Notice: Subject to any disclaimer, the term of this patent is extended or adjusted under 35 U.S.C. 154(b) by 309 days.

(21) Appl. No.: 17/067,392

(22) Filed: Oct. 9, 2020

(65) Prior Publication Data

US 2021/0027639 A1 Jan. 28, 2021

Related U.S. Application Data

(63) Continuation of application No. 16/157,968, filed on Oct. 11, 2018, now Pat. No. 10,847,042.

(51) Int. Cl.
*G08G 5/00* (2006.01)
*G01S 19/47* (2010.01)
*G01S 13/88* (2006.01)

(52) U.S. Cl.
CPC .......... *G08G 5/0086* (2013.01); *G01S 13/882* (2013.01); *G01S 19/47* (2013.01); *G08G 5/0039* (2013.01)

(58) Field of Classification Search
None
See application file for complete search history.

(56) References Cited

U.S. PATENT DOCUMENTS

| 5,483,241 A | 1/1996 | Waineo et al. |
| 7,145,501 B1* | 12/2006 | Manfred ................. G01S 13/89 342/120 |
| 8,643,533 B1 | 2/2014 | Woodell et al. |
| 8,755,954 B1* | 6/2014 | McCusker ............ G01S 13/426 701/4 |
| 8,798,812 B2 | 8/2014 | Ryu et al. |
| 10,459,085 B1* | 10/2019 | Bell ........................ G01S 19/40 |
| 10,495,751 B2* | 12/2019 | Moreira Neto ....... G01S 13/935 |
| 10,937,328 B2* | 3/2021 | Garden ................ G08G 5/0013 |
| 2005/0156777 A1 | 7/2005 | King et al. |

(Continued)

OTHER PUBLICATIONS

Barton, D.K., "Radar System Analysis and Modeling," IEEE A&E Systems Magazine, Apr. 2005, pp. 23-25.

(Continued)

*Primary Examiner* — Tamara L Weber
(74) *Attorney, Agent, or Firm* — Fenwick & West LLP

(57) ABSTRACT

A system having components coupled to an aircraft and components remote from the aircraft processes radar-augmented data, transmits information between aircraft system components and/or remote system components, and dynamically determines locations and states of the aircraft, while the aircraft is in flight. Based on the locations and states of the aircraft, the system generates instructions for flight control of the aircraft toward a flight path appropriate to the locations of the aircraft, and can update flight control instructions as new data is received and processed.

20 Claims, 9 Drawing Sheets

(56) References Cited

U.S. PATENT DOCUMENTS

| | | |
|---|---|---|
| 2008/0119970 A1 | 5/2008 | Campbell et al. |
| 2008/0154495 A1 | 6/2008 | Breed |
| 2013/0314266 A1 | 11/2013 | Pitt et al. |
| 2014/0195148 A1 | 7/2014 | Erignac et al. |
| 2015/0203214 A1* | 7/2015 | Bourret ................ G01C 23/005 701/4 |

OTHER PUBLICATIONS

PCT International Search Report and Written Opinion, PCT Application No. PCT/US2019/055016, dated Jan. 2, 2020, 19 pages.
United States Office Action, U.S. Appl. No. 16/157,968, dated Jan. 29, 2020, 20 pages.

* cited by examiner

SURVEY-AUGMENTED NAVIGATION SYSTEM FOR AN AIRCRAFT

CROSS REFERENCE TO RELATED APPLICATIONS

This application is a continuation of U.S. patent application Ser. No. 16/157,968, filed Oct. 11, 2018, which is incorporated by reference herein.

BACKGROUND

This disclosure relates generally to navigation systems, and more specifically to systems and methods for performing survey-augmented navigation during flight of an aircraft.

Proper navigation of an aircraft during flight is critical in relation to ensuring correct operation of an aircraft according to airspace type, according to terrain limitations, and/or according to different environmental situations. Successful navigation requires that the position, orientation, and motion states of an aircraft be known to a high degree of certainty at all times during flight of the aircraft. Current systems for automated navigation onboard an aircraft and/or remote from the aircraft require installation and maintenance of expensive apparatus, lack a high degree of precision, are not reliable to a high enough degree, drift in accuracy, and/or are prone to interference. The inventions described herein relate to improved systems and methods navigation, and can be used for automated control of an aircraft during flight.

SUMMARY

While an aircraft is in flight, a system having components coupled to the aircraft and components remote from the aircraft processes survey-augmented data (e.g., radar-augmented data), transmits information between aircraft system components and/or remote system components, and dynamically determines locations and states of the aircraft. The system and methods implemented by the system fuses information from a non-traditional navigation system architecture to precisely determine locations of the aircraft during flight. The system architecture also corrects for drift in accuracy of navigation subsystems and/or allows navigation subsystems to operate continuously when one or more subsystems of the navigation subsystems are unavailable. Based on the locations and states of the aircraft, the system can also generate instructions for flight control of the aircraft toward a flight path appropriate to the locations of the aircraft, and can update flight control instructions as new data is received and processed.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

1. System for Survey-Augmented Navigation

Figure 1A:
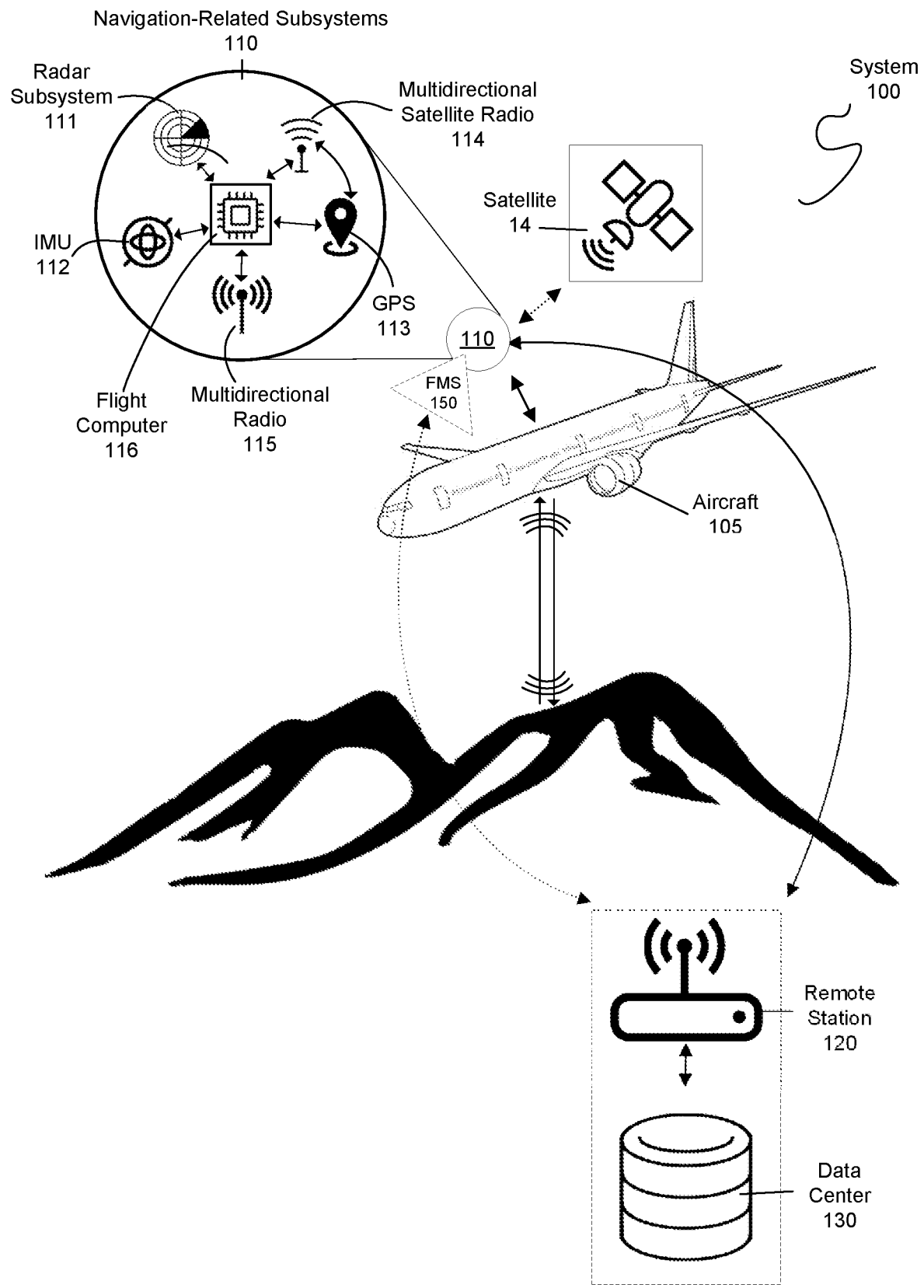
FIG. 1A is a schematic of a system for navigation, in accordance with one or more embodiments.

FIG. 1A depicts a schematic of a system 100 for navigation, in accordance with one or more embodiments. The system 100 includes one or more navigation-related subsystems 110 coupled to (e.g., mounted to, onboard, within, etc.) an aircraft 105, where the navigation-related subsystems are described in more detail below. The system 100 can also optionally include a remote station 120 in communication with a data center 130 at a location remote from the aircraft 105, such that some computing functions can be performed at a location remote from the aircraft 105. The system 100 can also include a flight management system (FMS) 150 including interfaces between the remote station 120 to the FMS 150 and/or interfaces between the navigation-related subsystems 110 and the FMS 150. The system 100 provides structures, subsystem interfaces, and operation modes useful for performing automated flight operations, including operations associated with methods described in more detail in Section 2 below.

The system 100 functions to augment low altitude flight operations, such as operations below a threshold altitude, with data from supplemental navigation subsystems, in order to generate better estimates of states of the aircraft in terms of position, movement, and orientation. Generation of more accurate estimates of aircraft state, especially in low altitude conditions, can improve navigation-based decision making (e.g., automated decision making) and flight planning for the aircraft 105. The system uses specialized radar tools to determine candidate locations of an aircraft during flight, and augments data from other navigation subsystems to hone in on a more precise location of the aircraft to assist navigation operations. The system also corrects for drift in accuracy of navigation subsystems and/or allows navigation subsystems to operate continuously when one or more subsystems of the navigation subsystems are unavailable.

1.1 System—Aircraft

Figure 1B:
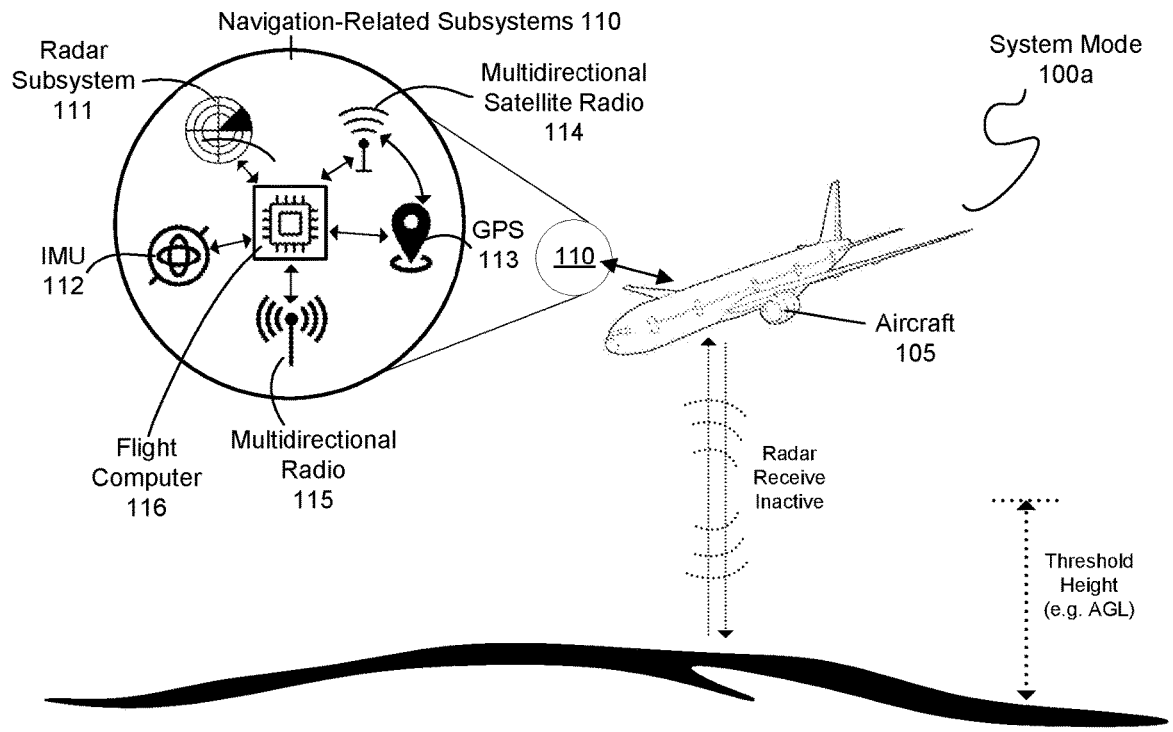
FIG. 1B is a schematic of operation modes of a system for navigation, in accordance with one or more embodiments.
Figure 1B:
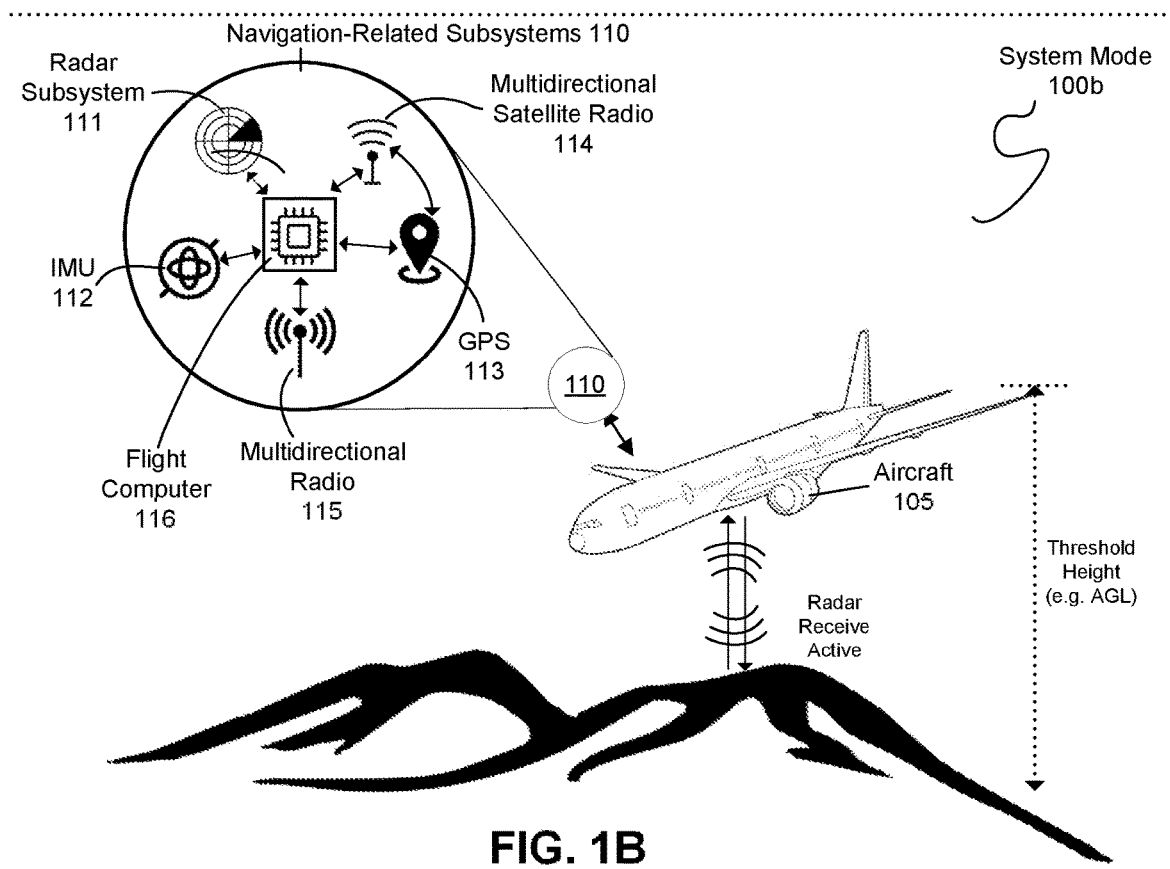

The aircraft 105 shown in FIG. 1 is a fixed-wing aircraft. The aircraft has flight control surfaces for aerodynamically affecting flight of the aircraft relative to a pitch axis (i.e., a transverse axis), a yaw axis (i.e., a vertical axis), and a roll axis (i.e., longitudinal axis) of the aircraft. Flight control surfaces can include one or more of: ailerons, flaps, elevators, stabilizers (e.g., horizontal stabilizers), rudders, spoilers, slats, air brakes, vortex generators, trim surfaces, and any other suitable control surfaces. The aircraft also has a power plant for generation of mechanical power associated with flight operations, and in variations, the power plant can include one or more of: a piston engine (e.g., in-line engine, V-type engine, opposed engine, radial engine, etc.), a gas turbine engine (e.g., turbojet engine, turbofan engine), a pulse jet, a rocket, a Wankel engine, a Diesel engine, an electric engine, a hybrid engine, and any other suitable power plant system. The power plant is coupled to an energy source (e.g., fuel system, battery, solar cell, etc.) and a cooling system (e.g., forced convection cooling system, liquid cooling system, oil cooling system, etc.) for aircraft performance in flight.

While this description uses a fixed-wing aircraft as an example, the principles described herein are equally applicable to variations of the aircraft 105 including form factors and/or control surfaces associated with one or more of: rotorcraft, gliders, lighter-than-air aircraft (e.g., airships, balloons), powered-lift aircraft, powered-parachute aircraft, weight-shift-control aircraft, rockets, vertical takeoff and landing (VTOL) aircraft (e.g., electric VTOL aircraft), and/or any other suitable types of aircraft. Still other variations of the system 100 can involve terrestrial vehicles, water vehicles, amphibious vehicles, or other non-aircraft vehicles.

1.2 System—Navigation-related Subsystems

The navigation-related subsystems 110 include subsystems capable of generating data associated with dynamic states of the aircraft and operational states and configurations of the aircraft, where the navigation-related subsystem components 110 produce data that can be processed to determine locations of the aircraft during flight. The navigation-related subsystems 110 also include subsystems capable of transmitting data from the aircraft 105 and other remote systems.

The navigation-related subsystems 110 include subsystems that generate and receive information generated from subsystems coupled to the aircraft 105, as well as a flight computer 116 providing computational infrastructure (e.g., processing components, communication buses, memory, storage etc.) for communicating data between the subsystems. The flight computer 116 thus provides architecture for communication of data generated by subsystems, for communication with other systems remote from the aircraft 105, for control of subsystems, and/or for control of the aircraft. The flight computer 116 can also include architecture for reporting navigation-associated information to an operator (e.g., pilot) of the aircraft 105, for instance, in manual operation modes or semi-manual operation modes where navigation states can be displayed to the operator (e.g., through an electronic flight instrument system). The navigation-related subsystems 110 can thus include specialized computer components designed for use in an aircraft, and in particular, can include components that are customized in configuration relative to each other and customized in relation to processing of signals received and processed to perform aspects of the methods described in Section 2 below.

Information routed between subsystems of the navigation-related subsystems 110 can optionally be routed through a flight management system (FMS) 150 that is configured for automation of flight tasks in relation to a flight plan. The FMS 150 processes navigation database information (e.g., information associated with waypoints, airways, navigation aids, airports, runways, departure procedures, arrival procedures, holding patterns, etc.), aircraft subsystem statuses, and outputs of other subsystems and determines one or more desired flight paths based on the information. The FMS 150 can cooperate with the flight computer 115 in receiving outputs of other subsystems of the navigation-related subsystems 110 and/or transmitting control instructions to affect operational states of other subsystems of the navigation-related subsystems 110. The FMS 150 can also include or interface with other control systems (e.g., of an autopilot) to transform calculated flight information into instructions for control of control surfaces of the aircraft 105 including one or more of: ailerons, flaps, elevators, stabilizers (e.g., horizontal stabilizers), rudders, spoilers, slats, air brakes, vortex generators, trim surfaces, and any other suitable control surfaces.

1.2.1 System—Navigation-related Subsystems—Radar Subsystem

As shown in FIG. 1A, the navigation-related subsystems 110 include a radar subsystem 111 mounted to the aircraft, where the radar subsystem 111 includes radar transmit and receive antennas configured to enable detection of features of objects associated with a flight path of the aircraft. Radar transmit antennas of the radar subsystem 111 emit in the radio portion of the electromagnetic spectrum. Radar transmit antennas can further transmit signals that have a wavelength, gain, carrier, pulse width, pulse repetition frequency, staggering, and any other suitable characteristic suitable for generation of return signals that can be processed to determine features of objects interacting with the transmitted signals. Radar receive antennas of the radar subsystem 111 receive in the radio portion of the electromagnetic spectrum and receive signals that have an effective aperture and gain. Radar receive antennas can be coupled with elements (e.g., filters, polarizers, etc.) configured to prevent or otherwise mitigate undesired return signals associated with clutter, interference, noise, and/or jamming. Radar receive antennas can additionally or alternatively be coupled with elements (e.g., attenuators) configured to prevent saturation of the receive elements from a return signal. Radar transmit and/or receive components can, however, be coupled to any other suitable elements (e.g., waveguides, duplexers, etc.) that refine aspects of the emitted and/or received signals in a desired manner. Furthermore, radar antennas can include phased array configurations (e.g., passive phased array configurations, active phased array configurations, conformal phased array configurations, etc.) or other suitable antenna configurations.

The radar subsystem 111 can have one or more radar antennas structurally mounted to the aircraft and positioned so as to transmit signals away from a ventral surface of the aircraft 105 and/or receive signals transmitted or reflected toward the ventral surface of the aircraft. As such, radar antennas can be configured to receive signals from terrain and/or other objects below the aircraft during flight. Antennas of the radar subsystem 111 can alternatively be positioned relative to the aircraft in any other suitable manner (e.g., coupled to a non-ventral surface) in order to receive signals that can be processed to determine locations of the aircraft in flight.

Multiple radar antennas can be used for system redundancy (e.g., in the event a subset of antennas are compromised). Multiple radar antennas can also be used for providing different positions from which to emit radar signals toward objects of interest and/or for receiving radar signals from objects of interest, depending upon orientation of the aircraft 105 or characteristics of objects from which return signals are generated.

The antenna(s) of the radar subsystem 111 can be coupled to an exterior portion of the aircraft 105. One or more antenna(s) of the radar subsystem 111 can alternatively be coupled to an interior portion of the aircraft 105 and extend through a wall of the aircraft 105 to transmit and/or receive signals outside of the aircraft 105. Mounting positions are associated with desired directionality in relation to transmitted radar signals and/or received signals, in relation to relative orientations between the aircraft and objects used to determine the location(s) of the aircraft 105 during flight. The antenna(s) of the radar subsystem 111 can thus be fixed in position. The antenna(s) of the radar subsystem 111 can alternatively be adjustable in position and/or rotation based on orientations of the aircraft in flight. The radar subsystem 111 can thus include actuators coupled to the antenna(s) of the antenna subsystem 111 and/or position encoders coupled to the actuators, in relation to electronic control of antenna positions.

The radar subsystem 111 produces output signals that have a characteristic resolution and power, and from which transmit time-related parameters (e.g., time between transmission of a signal and receipt of a return signal), distance-related parameters (e.g., distance between the aircraft and an object), reflector object parameters (e.g., shape, surface features, etc.), scattering parameters, frequency modulation parameters, speed-related parameters (e.g., change in distance between the aircraft and an object), and/or any other suitable parameters can be extracted to determine a location of the aircraft during flight.

Furthermore, while images are described, the radar subsystem 111 can be supplemented with or otherwise replaced with a light detection and ranging (LIDAR) subsystem that includes light emission elements and/or light sensors for receipt of optical signals indicative of features about the aircraft (e.g., in relation to light reflective objects, light scattering objects, light absorbing objects, light responsive objects, etc.), where the optical signals can be processed to determine locations of the aircraft 105 during flight, in relation to the method(s) described in Section 2 below. In still other variations, the radar subsystem 111 can be supplemented with or otherwise replaced with other camera components (e.g., stereo cameras, monocular cameras) that generate information (e.g., stereo information from which height information can be derived) while the aircraft 105 is in motion, where the height information can be used to determine locations of the aircraft 105 during flight, in relation to the method(s) described in Section 2 below. As such, the system 100 can implement other sensors that provide height information related to positions of the aircraft 105, in order to augment navigation of the aircraft 105 in space.

1.2.2 System—Navigation-Related Subsystems—IMU Components

The navigation-related subsystems 110 also include one or more inertial measurement units (IMUs) 112 for measuring and outputting data associated with the aircraft's specific force, angular rate, magnetic field surrounding the aircraft 105, and/or other position, velocity, and acceleration-associated data. Outputs of the IMU(s) can be processed with outputs of other aircraft subsystem outputs to determine poses of the aircraft 105 relative to a landing site (or other target), and/or pose trajectories of the aircraft 105 relative to a landing site (or other target). The IMU 112 includes one or more accelerometers, one or more gyroscopes, and can include one or more magnetometers, where any or all of the accelerometer(s), gyroscope(s), and magnetometer(s) can be associated with a pitch axis, a yaw axis, and a roll axis of the aircraft 105.

The IMUs 112 are coupled to the aircraft, and can be positioned internal to the aircraft or mounted to an exterior portion of the aircraft. In relation to measurement facilitation and/or post-processing of data form the IMU, the IMU can be coupled to a vibration dampener for mitigation of data artifacts from sources of vibration (e.g., engine vibration) or other undesired signal components.

1.2.3 System—Navigation-related Subsystems—GPS Components

The navigation-related subsystems 110 can include a global positioning system (GPS) 113 coupled to the aircraft and including antennas tuned to frequencies transmitted by satellites for receiving location-associated and velocity-associated data of the aircraft 105. The GPS 113 has a GPS processor, a clock, and a data link (e.g., wireless data link, wired data link). The GPS 113 can include a display, and can include any suitable number of channels (e.g., greater than 12 channels, less than or equal to 12 channels, etc.) for monitoring of different satellites. The GPS 113 can be electronically coupled to an electrical system of the aircraft 105 for power and/or alternatively include an independent power source (e.g., for a portable configuration). The GPS 113 can further be coupled to other subsystems of the navigation-related subsystems 111. The GPS 113 can additionally or alternatively be coupled to the FMS 150. The GPS 113 can include one or more receiver inputs for differential corrections (e.g., using an RTCM SC-104 format) and/or can be configured as a wide area augmentation system (WAAS) receiver. Furthermore, the GPS 113 can include architecture for relaying data (e.g., location-associated data, time-associated data, velocity-associated data, etc.) to other data processing devices using a NMEA 0183 protocol or any other suitable protocol (e.g., SiRF protocol, MTK protocol, etc.).

The GPS 113 can have one or more receivers coupled to the aircraft 113 (e.g., within the aircraft, mounted to the aircraft) and positioned so as to mitigate interference from other portions of the aircraft 105 (e.g., structural features of the aircraft) and/or other subsystems associated with the aircraft 105.

In relation to the IMU 112, the GPS 113 can also be communicatively coupled to the IMU 112 as an IMU-enabled GPS. In IMU-enabled GPS configurations, the GPS 113 can thus include operation modes that output location-associated information and/or velocity-associated information when satellite signals to the GPS 113 are unavailable, based on position and velocity outputs of the IMU 112 and a reference location of the aircraft 105 from the GPS, when satellite signals to the GPS 113 were available.

In relation to the GPS 113, the navigation-related subsystems 110 can also include a satellite transmission subsystem 114 including relays for interfacing with one or more satellites including satellite 14. The satellite transmission subsystem 114 can thus include channels associated with the GPS 113 described above in relation to receipt and transmission of satellite signals associated with the GPS 113. The satellite transmission subsystem 114 can additionally or alternatively include channels associated with transmission and/or reception of satellite data for traffic avoidance in coordination with automatic dependent surveillance broadcast (ADS-B) functionality, for weather services (e.g., in relation to weather along flight path, in relation to winds aloft, in relation to wind on the ground, etc.), for flight information (e.g., associated with flight restrictions, for notices, etc.), and/or for any other suitable purpose. The satellite transmission subsystem 114 operates in approved frequency bands (e.g., bands approved through Federal Communications Commission regulations, bands approved through Federal Communications Commission advisory circulars, etc.). The system 100 can additionally or alternatively implement other ground and/or space-based augmentation systems.

1.2.4 System—Navigation-related Subsystems—Communication Components

The navigation-related subsystems 110 also include a radio transmission subsystem 115 for communication with the aircraft 105, for transmission of aircraft identification information, or for transmission of other signals. The radio transmission subsystem 115 can include one or more multidirectional radios (e.g., bi-directional radios) onboard the aircraft, with antennas mounted to the aircraft in a manner that reduces signal transmission interference (e.g., through other structures of the aircraft). The radios of the radio transmission subsystem 115 operate in approved frequency bands (e.g., bands approved through Federal Communications Commission regulations, bands approved through Federal Communications Commission advisory circulars, etc.).

The communication-related components of the flight data subsystems 110 can additionally or alternatively cooperate with or supplement data from other avionics components (e.g., the GPS 113), electrical components (e.g., lights), and/or sensors that support flight operations (e.g., in flight, during landing, on the ground, etc.), that support observability by other traffic, that support observability by other aircraft detection systems, that provide environmental information (e.g., pressure information, moisture information, visibility information, etc.) and/or perform other functions related to aircraft communications and observability.

Furthermore, the system 100 can operate in multiple modes. For instance, in a first operation mode, the system 100 can implement onboard radar-augmented (or other height data-augmented) navigation system components to locally make navigation decisions for the aircraft 105. In a second operation mode, the system 100 can implement remote radar-augmented (or other height data-augmented) navigation system components to remotely make navigation decisions for the aircraft 105.

1.3 System—Remote Components

As shown in FIG. 1A, the system 100 can optionally include a remote station 120 that includes devices for wirelessly receiving data from and transmitting data to subsystems coupled to (e.g., onboard, the aircraft). The remote station 120 includes one or more multidirectional radios (e.g., bi-directional radios) onboard the aircraft, with antennas mounted to the aircraft in a manner that reduces signal transmission interference (e.g., through other structures of the aircraft). The radios of the remote station operate in approved frequency bands (e.g., bands approved through Federal Communications Commission regulations, bands approved through Federal Communications Commission advisory circulars, etc.). The remote station 120 is in communication with a data center 130 for storage and retrieval of data derived from subsystems of the aircraft 105. The data center uses storage and retrieval protocols and can use data encryption protocols for promoting security in relation to handling sensitive information pertaining to autonomous flight of the aircraft 105.

The remote station 120 can also use communications technologies and/or protocols in relation to data transmission operations with the data center 130, subsystems of the aircraft 105, and/or the operator interface 140 described in more detail below. For example, the remote station 120 can have communication links using technologies such as Ethernet, 802.11, worldwide interoperability for microwave access (WiMAX), 3G, 4G, code division multiple access (CDMA), digital subscriber line (DSL), or other communication technologies. Examples of networking protocols used for communications with the remote station 120 include universal datagram protocol (UDP) and/or any other suitable protocol. Data exchanged with the remote station 120 can be represented using any suitable format.

1.4 System—Altitude-based Operation Modes

FIG. 1B depicts a schematic of operation modes of the system 100 shown in FIG. 1A, in accordance with one or more embodiments. As shown in FIG. 1B, the system 100 can transition between a first operation mode 100a associated with operations at or above a threshold altitude (e.g., above ground level altitude, mean sea level altitude, etc.) and a second operation mode 100b associated with operations at or below a threshold altitude relative to a reference point (e.g., relative to above ground level altitude, relative to mean sea level altitude, etc.). In the first operation mode 100a (shown in FIG. 1B, top), the aircraft 105 is above the threshold altitude (e.g., 2000 ft. above ground level), and the navigation-related subsystems 110 include the IMU 112 and the GPS 113 in active modes and receive functions of the radar subsystem 111 in an inactive mode. In the first operation mode 100a, the flight computer 116 and/or the remote station 120 generate estimates of the state (e.g., position, orientation, velocity, etc.) of the aircraft 105 upon processing outputs of the IMU 112 and the GPS 113 (if satellite signals to the GPS 113 are available).

In the second operation mode 100b (shown in FIG. 1B, bottom), the aircraft 105 is at or below the threshold altitude (e.g., 2000 ft. above ground level), and the navigation-related subsystems 110 include the IMU 112 and the GPS 113 in active modes, and receive functions of the radar subsystem 111 in an active mode. In the second operation mode 100b, the flight computer 116 and/or the remote station 120 generate estimates of the state (e.g., position, orientation, velocity, etc.) of the aircraft 105 upon processing outputs of the radar subsystem 111, the IMU 112, and the GPS 113 (if satellite signals to the GPS 113 are available).

Detection of altitudes of the aircraft relative to the threshold altitudes can be implemented by the system 100 based on measurements output from an altimeter of the aircraft 105. Based on detected altitudes, the flight computer 116 of the aircraft 105 can transition subsystems of the navigation-related subsystems 110 between active and inactive modes according to operation modes 100a and 100b.

In alternative embodiments, the radar subsystem 111 may not be transitioned to a fully inactive state in response to altitude of the aircraft 105 or other factors. For instance, the radar subsystem may be periodically activated above a threshold altitude or in response to another triggering factor (e.g., to periodically test the system 100).

Still alternatively, transitioning the radar subsystem 111 to an inactive state may be implemented in relation to power limitations (e.g., to conserve energy) in certain aircraft operation modes or due to location-based limitations (e.g., in regions or airspaces that require deactivation of the radar subsystem 111).

Methods for processing outputs to determine state estimates are described in more detail in Section 2 below.

1.5 System—Conclusion

Variations of elements of the system 100 described above and shown in FIGS. 1A and 1B can be configured in any other suitable manner. For instance, portions of one or more of: the flight computer 115 onboard the aircraft 105, the FMS 150, the remote station 120, and/or the data center 130 can operate as a computing system that includes machine-readable instructions in non-transitory media for implementation of an embodiment of the method 200 described below, in relation to one or more of: monitoring an altitude status of an aircraft in flight; in response to the altitude status satisfying a threshold altitude condition, transitioning a radar subsystem of the aircraft to a receive mode; from the radar system in the receive mode, characterizing an object height of an object below the aircraft; generating a set of candidate locations of the aircraft from the object height; determining a location of the aircraft upon processing the set of candidate locations with an inertial measurement unit (IMU) output of an IMU coupled to the aircraft; updating a state estimate of the aircraft with the location; generating a set of instructions for flight control of the aircraft toward a flight path appropriate for the location (e.g., with the FMS 150, etc.); and performing any other method portion described. In relation to flight control, the system 100 can include an electronic interface between the computing system (e.g., flight computer 116, remote station 120) and an FMS 150 of the aircraft (e.g., as supported by the computing system), the electronic interface operable in a mode that transmits the set of instructions to the flight management system and controls flight of the aircraft toward the flight path. One or more portions of the computing system described above can further include architecture for storing a database of navigation object characteristics relevant to flight paths of the aircraft 105, where the database of navigation object characteristics can include a high-resolution height map database of terrain, static objects, infrastructure associated with moving objects, activatable markers, and/or other features below or in the path of the aircraft 105 during flight. The database can be accessed by portions of the computing system to facilitate portions of the method 200 described below.

Additional aspects of the method 200 are described in further detail in Section 2 below. Further, while the system(s) described above can implement embodiments, variations, and/or examples of the method(s) 200 described below, the system(s) can additionally or alternatively implement any other suitable method(s).

2. Method for Survey-Augmented Navigation

Figure 2A:
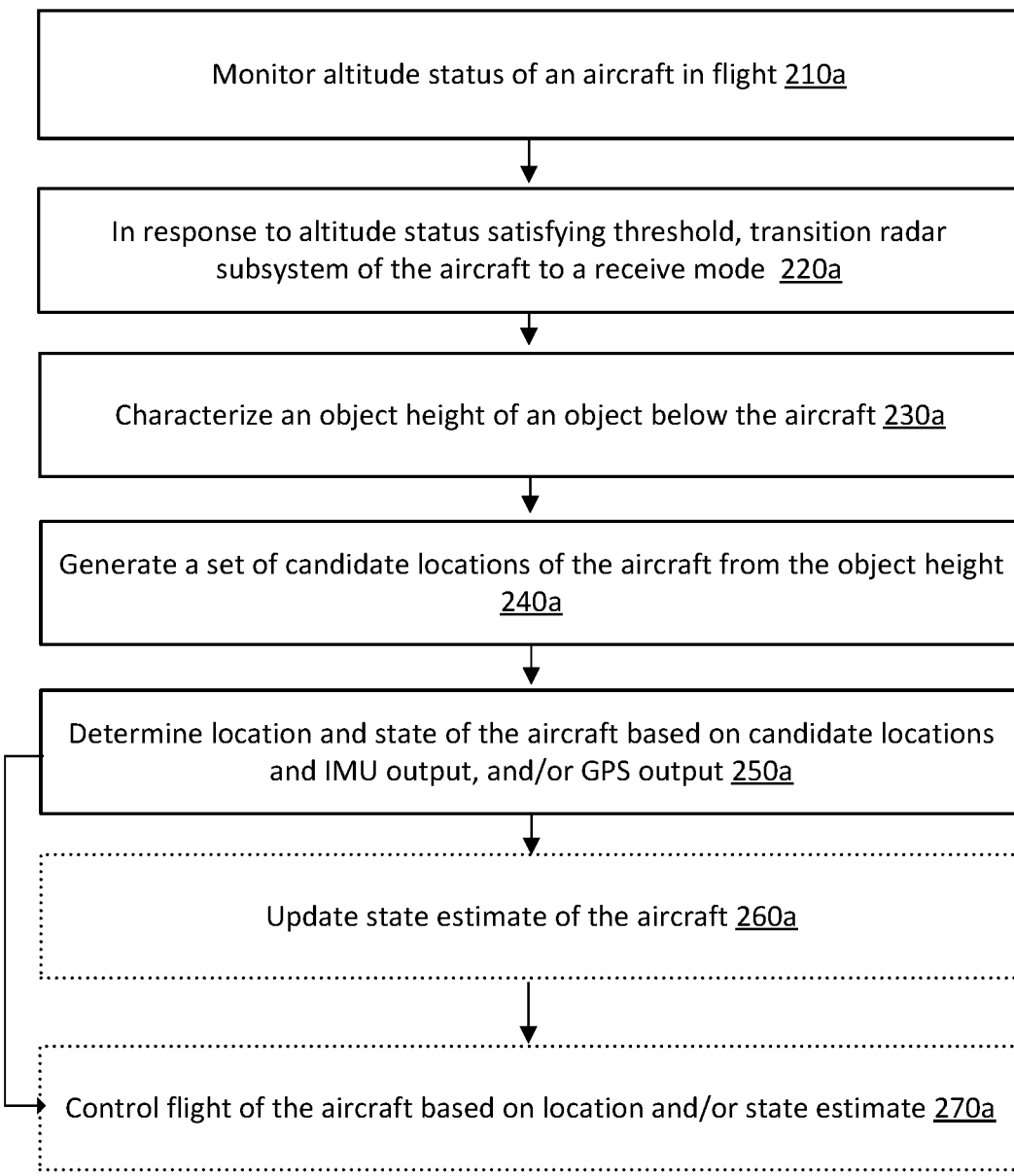
FIG. 2A depicts a flowchart of a method for navigation, in accordance with one or more embodiments.
Figure 2B:
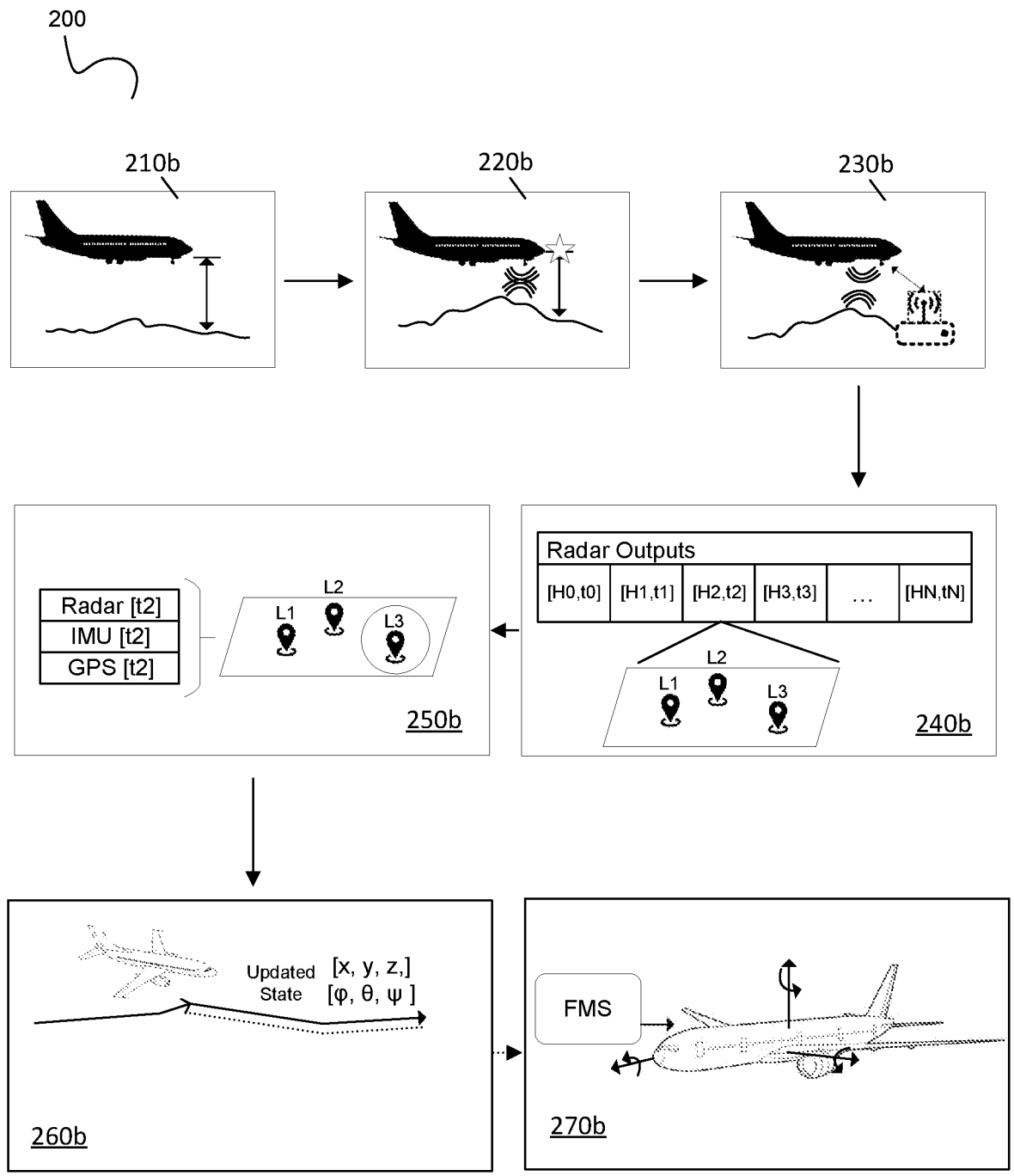
FIG. 2B depicts a schematic of a method flow according to embodiments shown in FIG. 2A.

FIG. 2A depicts a flowchart of a method 200 for radar-augmented navigation, in accordance with one or more embodiments. FIG. 2B depicts a schematics of a method flow according to embodiments shown in FIG. 2A. The method 200 functions to process sensor-derived data, transmit information between navigation-related subsystems and/or systems remote from the aircraft, and dynamically determine estimates of the state (e.g., position, orientation, velocity, etc.) of the aircraft during flight, for navigation purposes. Based on the estimated state(s), the method 200 can also generate instructions for flight control of the aircraft toward a flight path appropriate for the location of the aircraft, and can update flight control instructions as new data is received and processed. The method 200 can also include functionality for directly controlling flight of the aircraft at the location of the aircraft in a reliable and safe manner. The method 200 can be implemented by one or more embodiments of the system 100 described above, in relation to FIGS. 1A and 1B. In particular, portions of the method 200 can be implemented by the computing system components described above, for instance, at portions of the computing system operating at a flight computer onboard the aircraft and/or portions of the computing system operating at a remote station with communication of inputs and outputs across computing system components as defined by the architecture described above.

The method 200 thus functions to generate and process data from a non-traditional navigation system architecture to augment low altitude flight operations (e.g., operations below a threshold altitude), in order to generate better estimates of states of the aircraft in terms of position, movement, and orientation. The method 200 can also function to generate and process data from a non-traditional navigation system architecture to augment flight operations associated with other suitable trigger, for instance, when position is uncertain but the aircraft is within range of radar communication apparatus. Generation of more accurate estimates of aircraft state, especially in low altitude conditions, can improve navigation-based decision making (e.g., automated decision making) and flight planning for the aircraft. The method involves implementation of radar tools to determine candidate locations of an aircraft during flight, and augmenting data from other navigation subsystems to hone in on a more precise location of the aircraft to assist navigation operations. The method also corrects for drift in accuracy of navigation subsystems (e.g., of IMUs) and/or allows navigation subsystems to operate continuously when one or more subsystems of the navigation subsystems are unavailable. For instance, the method 200 can provide accurate location identification even when GPS signals are unavailable.

2.1 Method—Altitude Monitoring for Radar Receive Activation

As shown in FIGS. 2A and 2B, Blocks 210*a* and 210*b* include functionality for monitoring an altitude status of the aircraft during flight of the aircraft. In particular, in relation to system elements described above, the flight computer 116 or other portion of the computing system (e.g., remote station 120, FMS 150) receives 210*a*, 210*b* altitude measurements from an altitude sensor of an altimeter of the aircraft. The flight computer 116 or other portion of the computing system (e.g., remote station 120, FMS 150) can then optionally perform an altitude status monitoring operation by processing the received altitude measurements, and comparing the received altitude measurements to a threshold condition. The threshold condition can be a threshold altitude of a set distance (e.g., 2000 ft., 2500 ft., 3000 ft., 3500 ft., etc.) above ground level, a threshold altitude associated with limitations of the radar subsystem in transmit/receive functions, a threshold altitude associated with computational ability to distinguish relevant features from received radar signals, a threshold altitude associated with interference from other environmental aspects (e.g., moisture in the air, particulate matter in the air, etc.), and/or any other suitable threshold altitude condition. Outputs of the altitude status monitoring process include computer-readable objects indicative of satisfaction of the threshold altitude condition by the measured altitude of the aircraft.

In some embodiments, the flight computer 116 or other portion of the computing system can omit adjusting navigation system states based upon altitude thresholds. Still alternatively, in an embodiment where the radar subsystem 111 is articulated, the orientation of radar subsystem 111 components can instead be adjusted between a first orientation (e.g., a forward orientation) to a second orientation (e.g., a downward orientation) based on altitude of the aircraft 105 or another factor.

Based upon outputs of the altitude monitoring process, the flight computer 116 or other portion of the computing system (e.g., remote station 120, FMS 150) transitions 220*a*, 220*b* a radar subsystem of the navigation-related subsystems between an active mode for receiving radar signal returns, and an inactive mode (e.g., whereby radar signal returns are not received). In more detail, if an output of the altitude status monitoring process indicates that the measured altitude of the aircraft is above the threshold altitude condition, the IMU(s) and GPS components of the navigation-related subsystems are active and generate data that is processed by the computing system (e.g., portion of the flight computer, portion of the remote station) to generate estimates of the state of the aircraft (e.g., in terms of position, in terms of orientation, in terms of velocity, etc.). For instance, above the threshold altitude, the computing system can directly process outputs of the GPS to extract position estimates (e.g., relative to geographic location) with coordinates and velocity estimates (e.g., in terms of ground speed, in terms of other aircraft velocities) and directly process outputs of the IMU(s) to determine estimates of the orientation of the aircraft (e.g., in relation to directions of lateral motion, in relation to directions of vertical motion in relation to rotation about pitch axes, in relation to rotation about roll axes, in relation to rotation about yaw axes, etc.).

At or below the threshold altitude, the IMU(s) and GPS components of the navigation-related subsystems are active and the radar subsystem of the navigation-related subsystems of the aircraft 105 is active to receive radar signals from objects associated with the flight path of the aircraft (e.g., objects below the aircraft). As such, at or below the threshold altitude, the radar subsystem generates data that augments outputs of the IMU(s) and the GPS to generate data that is processed by the computing system (e.g., portion of the flight computer, portion of the remote station) to generate estimates of the state of the aircraft (e.g., in terms of position, in terms of orientation, in terms of velocity, etc.), according to downstream portions of the method described below.

2.2 Method—Generation of Candidate Aircraft Locations from Radar Signals

As shown in FIGS. 2A and 2B, when the aircraft is at or below the threshold altitude, the computing system (e.g., portion of the flight computer, portion of the remote station, portion of the FMS) receives radar return signals (e.g., radar signals reflected off of or scattered from objects and back to receivers of the radar subsystems), and processes the radar return signals to determine 230*a*, 230*b* a height estimate for one or more objects below or otherwise spatially relevant to flight of the aircraft. The computing system processes the returned signals transmitted toward a radar receiver ventrally-located at the aircraft to generate a height estimate, where the height estimate can characterize one or more of: a distance between the aircraft and the object, an altitude at which the object rests (e.g., altitude above ground level, altitude above mean sea level, etc.), a height of the tallest point of the object (e.g., in relation to ground level, in relation to sea level), or any other suitable height-associated metric. In generating the height estimate, the computing system can determine distances based upon time measurements between an emitted signal and a received return signal corresponding to the emitted signal, with an echo analysis including transit time components. Generation of the height estimate can further incorporate aspects of signal wavelength, radar signal pulse features, encoded signals within an emitted signal, and/or any other suitable component of the radar signal that can be used to estimate distances, and ultimately, a height of the object. However, as indicated above, the height estimate can additionally or alternatively be determined through non-radar-based means (e.g., using LIDAR, using stereocamera configurations, using monocular camera configurations, etc.). Furthermore, generating the height estimate can take into account aircraft altitude and attitude aspects that can affect apparent altitude measured by radar analysis or through other means. For instance, the system can be configured to omit or adjust calculation of height estimates when the aircraft is in non-straight and level flight (e.g., during turns).

Additionally or alternatively, the computing system can determine other features of objects below or spatially relevant to a flight path of the aircraft. For instance, the computing system can determine object characteristics including one or more of: object shape (e.g., upon processing multiple return signals that have interacted with different surfaces of the object), surface features of the object (e.g., based upon analysis of radar scattering parameters, object speed (e.g., based upon Doppler shift analysis), lateral distance to the object (e.g., based upon transit time analysis of signals received from other directions), line-of-sight distance to the object, and/or any other suitable object features to determine a location of the aircraft during flight. For instance, radar reflectors positioned within observation range of the navigation systems of the aircraft during flight can be used to improve reliability and/or accuracy of navigation functions. Appropriate positions of the radar reflectors can be determined based upon surveying of terrain associated with flight operations, and multiple radar reflectors distributed in a pattern can be used to provide additional information or redundancy of radar reflectors.

Figure 2C:
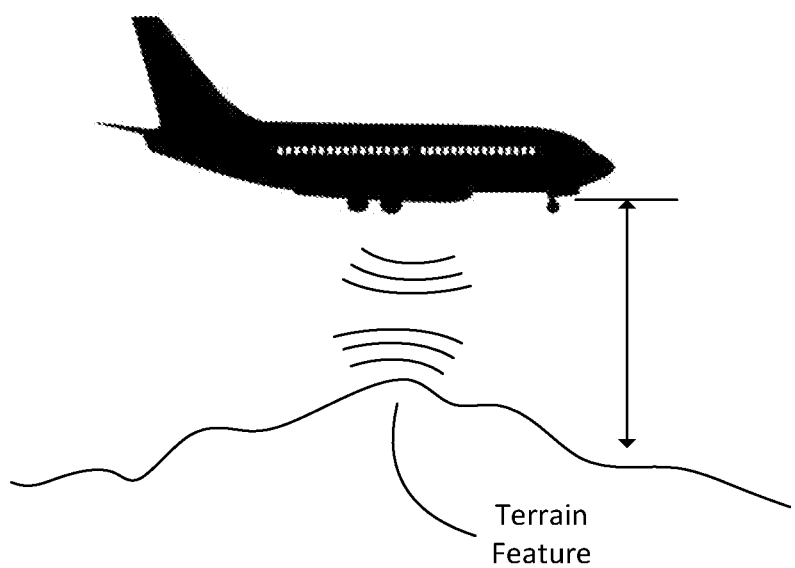
FIG. 2C depicts a schematic of navigation based on terrain feature detection, in accordance with one or more embodiments.

As such, the objects include static objects positioned below or otherwise spatially relevant to a flight path of the aircraft. Static objects can include terrain, as shown in FIG. 2C, terrain features (e.g., bodies of land, bodies of water, waterways, geological features, etc.), natural objects (e.g., trees, boulders, fields), non-natural objects (e.g., buildings, transportation infrastructure, antennas, energy-harvesting structures, mines, other structures, man-made water masses, etc.), and/or any other suitable static objects. Estimation of aircraft location and/or state based on such static objects is described in downstream portions of the method 200 below, and variations of the method described below.

As shown in FIGS. 2A and 2B, the computing system (e.g., portion of the flight computer, portion of the remote station, portion of the FMS) receives the object height and/or other features of the object as described above (e.g., using radar, using LIDAR, using stereocamera information, using monocular camera information, etc.), and generates 240*a*, 240*b* a set of candidate locations from the object height and/or other features. In one embodiment, the computing system compares the object height to heights of objects in a database of navigation object characteristics, where the heights of objects are surveyed at an earlier time during building of the database. The database of navigation object characteristics thus includes heights of objects mapped to locations of the objects, such that object heights extractable from return radar signals can be compared to entries in the database of navigation object characteristics to identify height matches corresponding to objects, and thus candidate locations of the aircraft due to knowledge of the object positions corresponding to the object heights. The computing system in 240*a*, 240*b* can additionally or alternatively use non-height-related features of objects observable in the radar return signals, and compare such features against relevant database entries to generate the set of candidate locations. As such, the database can additionally or alternatively include object features mapped to location, where object features can be defined as described above.

2.3 Method—Determination of Aircraft Location and Updated State Estimate

As shown in FIGS. 2A and 2B, with the set of candidate locations output from Blocks 240*a*, 240*b*, the computing system (e.g., portion of the flight computer, portion of the remote station, portion of the FMS) determines 250a, 250b the location of the aircraft upon processing the set of candidate locations with outputs of the IMU(s) and/or GPS, if GPS outputs are available. The computing system thus selects the candidate location of the set of candidate locations that best aligns with the IMU outputs and/or GPS outputs corresponding to the time stamp of the returned radar signals used to generate the set of candidate locations. In one embodiment, the computing system compares coordinates of each candidate location of the set of candidate locations to GPS coordinates extracted from the GPS output and determines the candidate location of the set of candidate locations that matches the location of the GPS output. In a related embodiment, if satellite signals to the GPS are unavailable at the time stamp associated with the radar return signals used to generate the set of candidate locations, the computing system can determine an IMU-based location estimate from a reference output of the GPS (e.g., a GPS output of aircraft location when GPS signals were last available) and position and velocity outputs of the IMU associated with the time stamp of the radar return signals used to generate the set of candidate locations. The computing system can thus facilitate IMU-enabled GPS operations, when satellite signals to the GPS are unavailable, to extrapolate location from IMU position and velocity outputs and a reference location from the GPS. Then, the IMU-based location estimate can be compared to coordinates of each candidate location of the set of candidate locations to determine the candidate location of the set of candidate locations that matches the location of the IMU-enabled output.

As shown in FIGS. 2A and 2B, the computing system also updates 260a, 260b the estimate of the state (e.g., position in 3D space, velocity in 3D space, and orientation in 3D space) of the aircraft based upon IMU and/or GPS outputs, and ties the state estimate to the location of the set of candidate locations that matches the available IMU and/or GPS outputs. As such, a stream of state estimates of the aircraft are aligned with locations of the aircraft determined from radar-augmented data, in order to provide augmented and validated information to aircraft systems for navigation purposes.

2.4 Method—Improvement of State Estimates with Historical Indexing

Figure 3A:
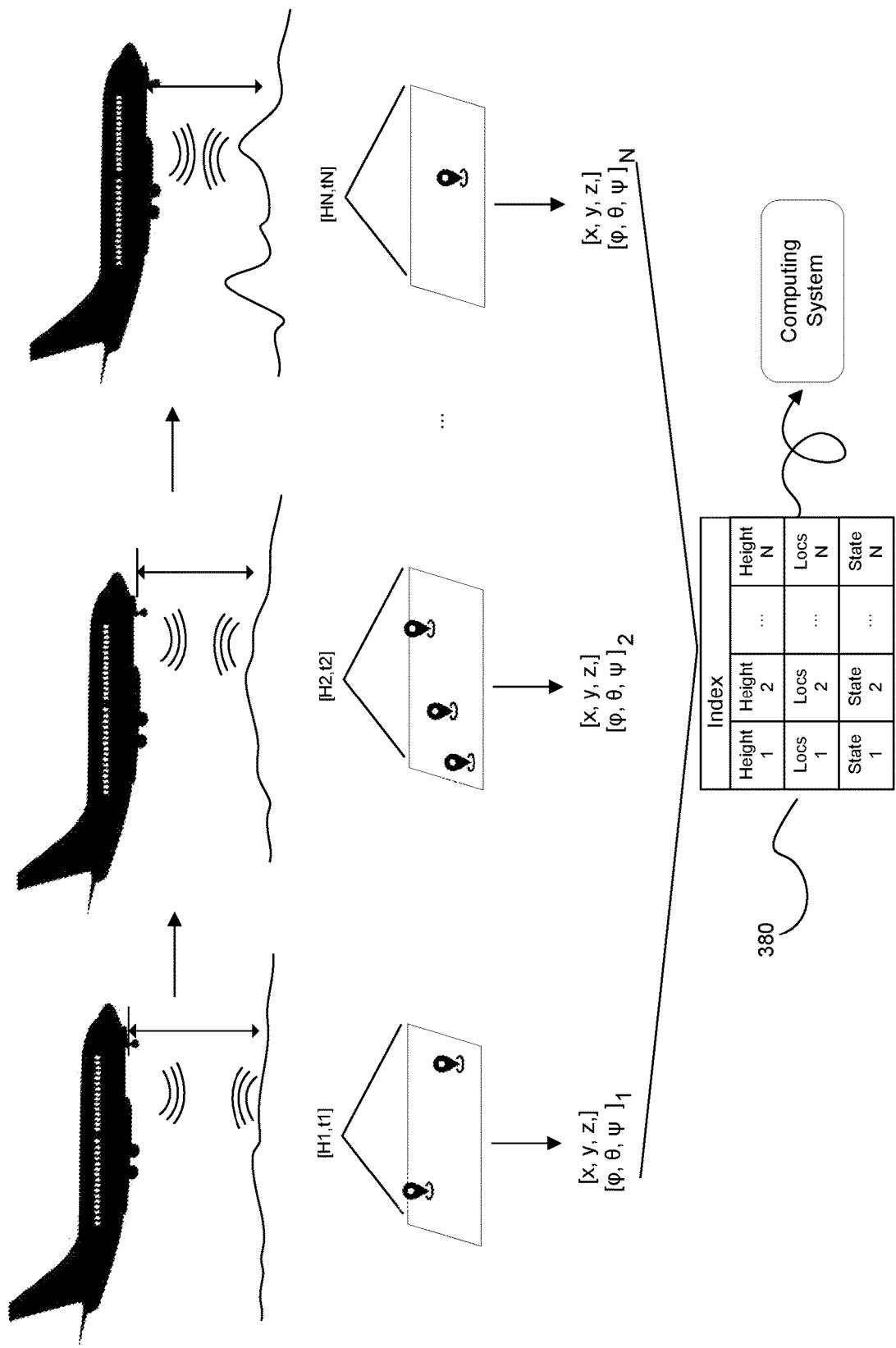
FIG. 3A depicts a schematic of a portion of the method shown in FIGS. 2A-2B.

As shown in FIG. 3A, the computing system (e.g., portion of the flight computer, portion of the remote station, portion of the FMS), in cooperation with navigation-related subsystems, updates and maintains 380 a running index of an aggregation of state estimates mapped to an aggregation of candidate locations and an aggregation of object heights and/or other object features from historical flights of the aircraft. As such, during each flight and across different flights, the computing system generates index entries linking object heights (H), time stamps (t), candidate locations (locs), and state estimates (3D positions and orientations). The running index can then be used by the computing system to improve state estimate determination over time, as flights over more locations are conducted and more entries to the running index are generated. With aggregation of more radar-augmented flight data, the search space associated with the running index for each subsequent flight decreases.

Figure 3B:
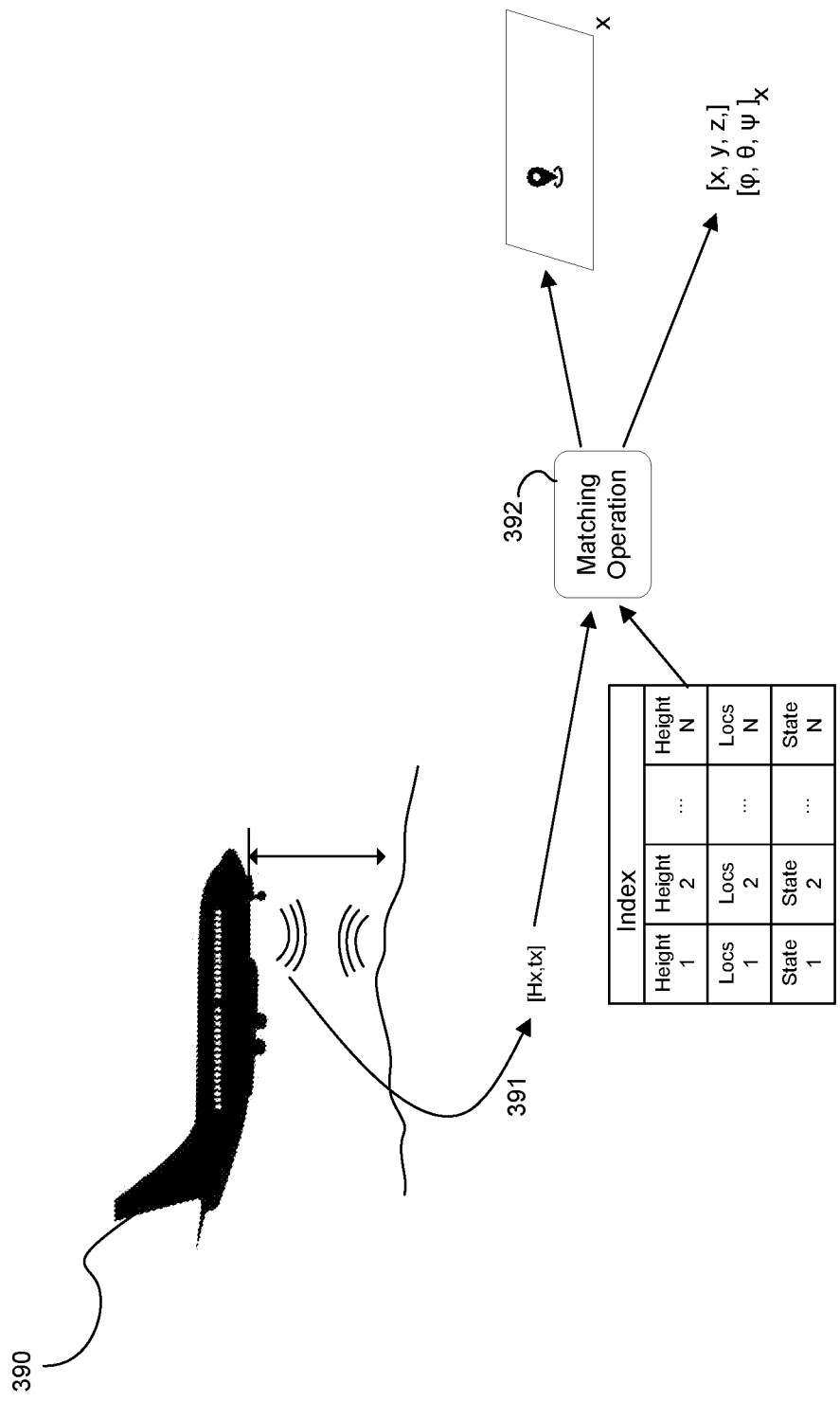
FIG. 3B depicts a schematic of another portion of the method shown in FIGS. 2A-2B.

In one embodiment 390 of use of the running index, as shown in FIG. 3B, for a subsequent flight, the computing system can determine a state estimate and/or location of the aircraft in the subsequent flight based on available entries of the running index. In more detail, the computing system processes returned radar signals to characterize 391 an object height ([Hx, tx]) of an object below the aircraft during the subsequent flight. The computing system can then perform a matching operation 392 with the object height and the running index to determine a location and state estimate of the aircraft that best matches the entries of the running index. For instance, the computing system can take the object height, perform a search algorithm (e.g., index search algorithm, linear search algorithm, binary search algorithm, etc.) with the running index to identify an appropriate entry of the running index, and identify the location and state estimate corresponding to the entry.

2.5 Method—Variations of State and Location Estimated with Different Object Types The methods described above can be adapted to improve aircraft state and location estimation based on radar-detection of different types of objects spatially relevant to a flight path of the aircraft.

Figure 4A:
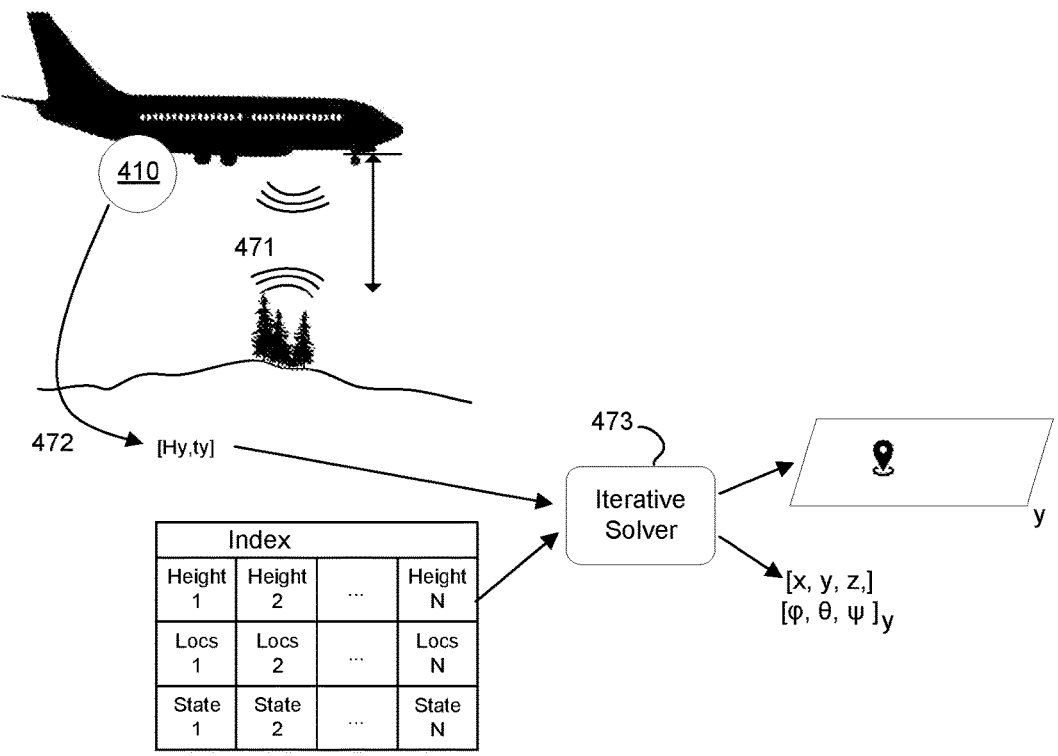
FIG. 4A depicts a schematic of navigation based on static object detection, in accordance with one or more embodiments.

In one implementation as shown in FIG. 4A, navigation-related subsystems 410 of the aircraft can generate 471 radar return signals from a static object (e.g., trees, fields, buildings, structures, etc.) below the aircraft (e.g., previously surveyed static objects to determine heights of static objects for the height map database), and the computing system (e.g., portion of the flight computer, portion of the remote station) can process the radar return signals to generate 471 a height estimate (Hy) with a time stamp (ty) for the static object. The computing system can then process the height estimate against the running index and/or database of navigation object characteristics described above, with an iterative solver operation 473 to output a location and state estimate (position in 3D space, orientation in 3D space, velocity, etc.) of the aircraft.

In one implementation as shown in FIG. 4A, navigation-related subsystems 410 of the aircraft can generate 471 radar return signals from a static object (e.g., trees, fields, buildings, structures, etc.) below the aircraft, and the computing system (e.g., portion of the flight computer, portion of the remote station) can process the radar return signals to generate 471 a height estimate (H) with a time stamp (t) for the static object. The computing system can then process the height estimate against the running index and/or database of navigation object characteristics described above, (e.g., with an iterative solver operation 473 that gradually arrives at a solution while reducing the error estimate in the solution) to output a location and state estimate (position in 3D space, orientation in 3D space, velocity, etc.) of the aircraft.

Figure 4B:
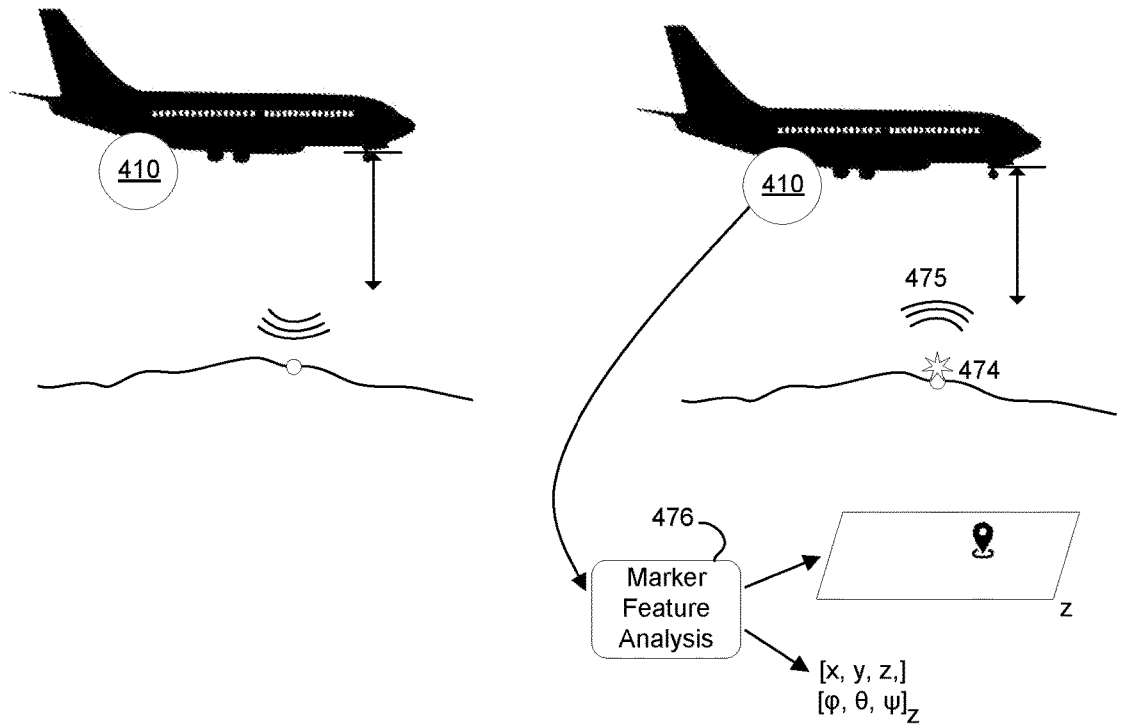
FIG. 4B depicts a schematic of navigation based on activatable marker detection, in accordance with one or more embodiments.

In another implementation as shown in FIG. 4B, navigation-related subsystems 410 of the aircraft can generate 475 radar return signals from an active radar-responsive object (e.g., marker) positioned below the aircraft, and the computing system (e.g., portion of the flight computer, portion of the remote station) can process the radar return signals with a marker feature analysis to generate 476 a location and state estimate (position in 3D space, orientation in 3D space, velocity, etc.) of the aircraft. In more detail, as directed by computer control of the radar subsystem, emitted radar signals (e.g., pulses, other waveforms) from transmit antennas of the radar subsystem can transition 474 the radar-responsive mark into an activated mode, and the computing system can receive a response signal from the radar-responsive marker in the activated mode. The response signal is then processed by the computing system to determine a location and state estimate of the aircraft. Information from the radar-responsive marker can also supplement height and feature-based analyses to generate a more precise estimate of aircraft location with higher confidence.

Figure 4C:
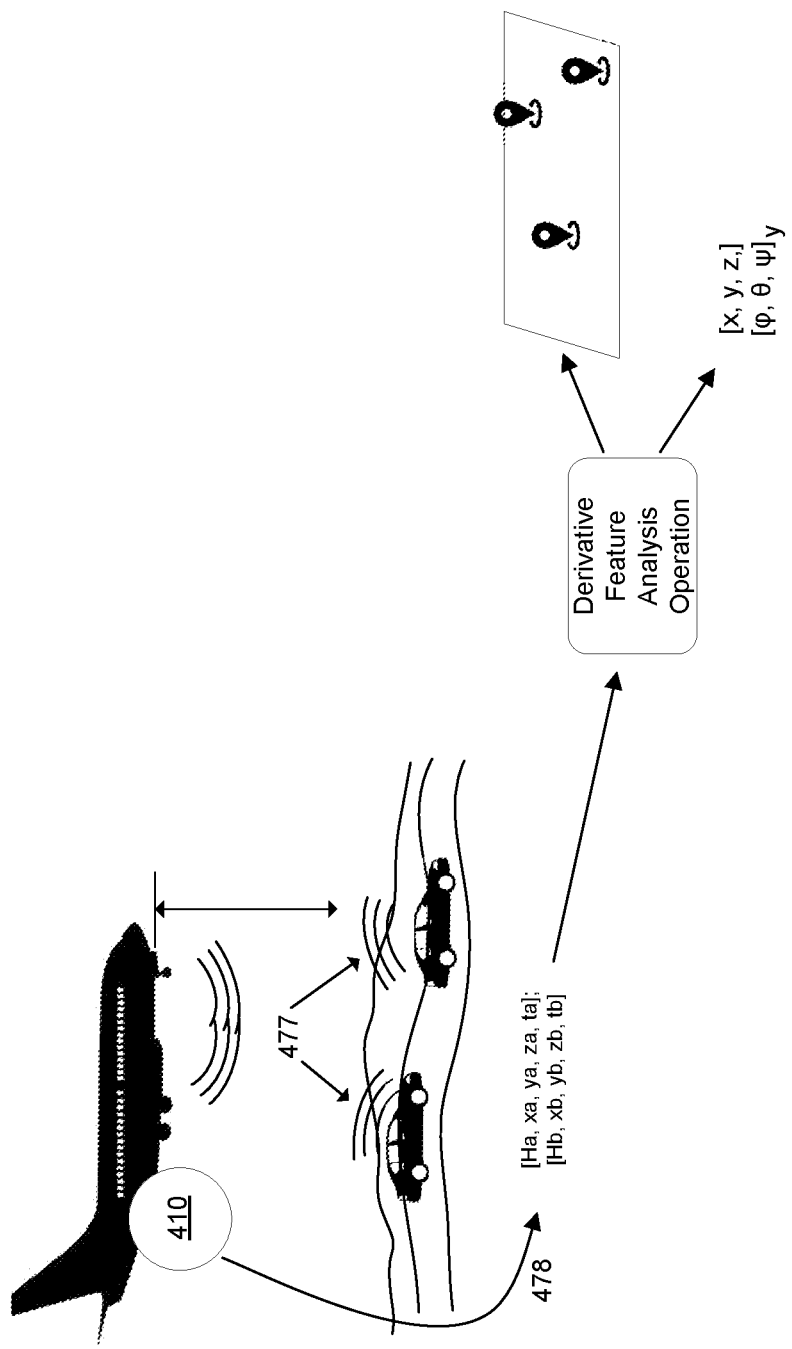
FIG. 4C depicts a schematic of navigation based on moving object detection, in accordance with one or more embodiments.

In another implementation as shown in FIG. 4C, navigation-related subsystems 410 of the aircraft can generate 471 radar return signals from one or more moving objects (e.g., terrestrial vehicles, etc.) below the aircraft, and the computing system (e.g., portion of the flight computer, portion of the remote station) can process the radar return signals to generate 471 a derivative feature derived from a path of motion of the moving object(s). In more detail, the radar subsystem of navigation-related subsystems 410 of the aircraft can receive 477 radar signal returns from the moving objects at multiple time points, where the radar signal returns are processed 478 by the computing system to extract height (H) and position (e.g., x, y, z position) of the moving objects at multiple time points, with associated time stamps (t). The computing system can then process the extracted height and information data to generate derivative features indicative of paths of motion of the moving objects. Derivative features can include morphological features associated with the paths of motion, and in examples, include one or more of: altitude changes in the path of motion, lateral position changes in the path of motion, shape features (e.g., radii of curvature, segment lengths, etc.) of the path of motion, boundaries of the path of motion along multiple axes, and any other suitable morphological features. The computing system can then analyze the derivative features associated with the path of motion to output a location and state estimate (position in 3D space, orientation in 3D space, velocity, etc.) of the aircraft.

2.6 Method—Flight Control

As shown in FIGS. 2A and 2B, the method 200 can include functionality for controlling 270a, 270b flight of the aircraft toward a flight path to the landing site. Based on the identified location and/or state estimate, the computing system (e.g., a portion of the computing system operating at a flight computer onboard the aircraft, a portion of the computing system operating at the remote station, etc.) generates instructions for flight control of the aircraft as appropriate to the location of the aircraft. The flight computer or other computing components controlling operation of flight control surfaces receive the instructions and control operational configurations of one or more control surfaces of the aircraft to maintain or redirect flight of the aircraft. As such, Blocks 270a, 270b include functionality for controlling flight of the aircraft toward the flight path upon transmitting the set of instructions to a flight computer of the aircraft and manipulating one or more flight control surfaces of the aircraft based on the set of instructions.

In Blocks 270a, 270b, the computing system (e.g., portion of the flight computer, portion of the remote station, portion of the FMS) can use generated instructions to control configuration states of one or more of: ailerons of the aircraft (e.g., to affect flight about a roll axis), flaps of the aircraft (e.g., to affect rate of descent), elevators of the aircraft (e.g., to control flight about a pitch axis), rudders of the aircraft (e.g., to control flight about a yaw axis), spoilers of the aircraft (e.g., to control lift of the aircraft), slats of the aircraft (e.g., to control angle of attack of the aircraft), air brakes (e.g., to control drag of the aircraft), trim surfaces (e.g., to control trim of the aircraft relative to any axis and/or reduce system mechanical load), and any other suitable control surfaces of the aircraft.

In Blocks 270a, 270b, the computing system (e.g., portion of the flight computer, portion of the remote station, portion of the FMS)) can also use generated instructions to control configuration states of power plant components including one or more of: manifold pressure, revolutions (e.g., revolutions per minute), fuel mixture, electrical output from a battery, cooling system operational states (e.g., in relation to cowl flaps, in relation to liquid cooling systems, in relation to fins, etc.) for aircraft performance toward the landing site.

In Blocks 270a, 270b, the computing system (e.g., portion of the flight computer, portion of the remote station, portion of the FMS) can also use generated instructions to control other aircraft system aspects. For instance, the generated instructions can be used to control communications with air traffic control at the landing site, in relation to automated reception and/or read back of instructions from air traffic control.

In relation to state of the aircraft (e.g., in position, in orientation, in velocity), the computing system generates instructions that account for aircraft orientation due to environmental effects. For instance, the computing system can generate instructions upon detecting crosswinds and computing a crosswind control factor for the ailerons and rudders of the aircraft. In another example, computing system can generate instructions for a flight path based on the location and prevailing winds at the altitude of the aircraft.

In relation to state of the aircraft (e.g., in position, in orientation, in velocity), the computing system can also generate instructions that account for environmental effects due to terrain at the location of the aircraft. For instance, the computing system can generate instructions for increasing altitude over terrain associated with high winds, in order to avoid turbulence. In another example, the computing system can generate instructions for control surface settings and/or power plant settings based on aircraft location at a leeward/downwind side of terrain, in order to avoid rotor effects.

However, the computing system can generate instructions used by the flight computer to control aircraft operation for other aircraft aspects, other environmental aspects, and/or other landing site aspects.

The method(s) described can, however, include any other suitable steps or functionality for determining aircraft states while the aircraft is in flight, controlling flight operation of the aircraft, and/or augmenting performance of navigation subsystems of the aircraft in any other suitable manner.

3. Conclusion

The system and methods described can confer benefits and/or technological improvements, several of which are described herein. For example, the system and method employ non-traditional use of sensors (e.g., radar subsystems, IMUS, GPSs, etc.) to determine locations and states of an aircraft while the aircraft is in flight at different altitudes. Navigation during flight, in particular, requires dynamic monitoring and control of aircraft operational states, and the method and system employ sensors in a novel manner for control of flight of aircraft (e.g., fixed wing aircraft, other aircraft) as appropriate to a specific location.

The system and method also reduces computing requirements and costs associated with standard systems for navigation. For instance, by using radar-augmented data and developing a database of locations and object features, the system is configured to ultimately achieve accurate determination of aircraft state and control of aircraft flight operation with less computing power than other systems for navigation.

The system and method also include functionality for evaluating performance of other navigation subsystems of the aircraft (e.g., IMU subsystems) to improve their performance, correct drift, or otherwise improve safety of a flight operation.

The system and method also include functionality for enabling determination of aircraft location and aircraft state during flight, even when other navigation subsystems of the aircraft (e.g., GPS subsystems) are unavailable.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, one implementation of which is set forth in the following claims.

What is claimed is:

1. A method for radar-augmented localization, the method comprising:
    monitoring an altitude status of an aircraft in flight using an altitude sensor while a radar subsystem of the aircraft is in an inactive mode;
    in response to the altitude status satisfying a threshold altitude condition, transitioning the radar subsystem of the aircraft from the inactive mode to an active mode of the radar subsystem;
    while the radar subsystem is in the active mode, emitting, by the radar subsystem, a radio frequency signal in a radio portion of an electromagnetic spectrum and characterizing an object height of an object below the aircraft based on the radio frequency signal reflected off the object and received by the radar subsystem;
    generating a set of candidate locations of the aircraft from the object height; and
    determining a location and a state estimate of the aircraft upon processing the set of candidate locations.

2. The method of claim 1, further comprising: upon detecting availability of a satellite signal from a global positioning system (GPS) of the aircraft, receiving a GPS output from the GPS and determining the location and the state of the aircraft from the set of candidate locations based on the GPS output.

3. The method of claim 1, further comprising: with the state estimate, the set of candidate locations, and the object height, updating a running index of an aggregation of state estimates mapped to an aggregation of candidate locations and an aggregation of object heights from historical flights of the aircraft.

4. The method of claim 3, further comprising: upon processing information from the radar subsystem in the active mode, characterizing a second object height of a second object below the aircraft, performing a matching operation with the second object height and the running index, and determining a second location and a second state estimate of the aircraft from the matching operation.

5. The method of claim 3, wherein the object comprises a static object positioned below the aircraft, and wherein determining the location of the aircraft further comprises applying an iterative solver operation to the object height of the static object and the running index.

6. The method of claim 1, wherein the object comprises a radar-responsive marker positioned below the aircraft in flight and transitionable into an activated mode upon receiving a radar signal from the radar subsystem, the method further comprising emitting a radar pulse from the radar subsystem, receiving a response signal from the radar-responsive marker in the activated mode, and determining the location and the state estimate from the response signal.

7. The method of claim 1, wherein the object comprises a dynamic object, and wherein the method further comprises determining the set of candidate locations from a path of motion of the dynamic object and the object height of the dynamic object.

8. The method of claim 7, wherein the dynamic object comprises a terrestrial vehicle, and wherein determining the set of candidate locations further comprises receiving a set of radar signals returned from the terrestrial vehicle along the path of motion, and determining the set of candidate locations from the set of radar signals.

9. The method of claim 1, wherein the object comprises a terrain feature positioned below the aircraft.

10. The method of claim 1, further comprising: based upon at least one of the location and the state estimate, generating a set of instructions for a flight computer of the aircraft, the set of instructions for flight control of the aircraft toward a flight path appropriate for the location.

11. A method for radar-augmented localization, the method comprising:
- monitoring an altitude status of an aircraft in flight using an altitude sensor while a radar subsystem of the aircraft is in an inactive mode;
- in response to the altitude status satisfying a threshold altitude condition, transitioning the radar subsystem of the aircraft from the inactive mode to an active mode of the radar subsystem;
- while the radar system in the active mode, emitting, by the radar subsystem, a radio frequency signal in a radio portion of an electromagnetic spectrum and characterizing an object height of an object below the aircraft based on the radio frequency signal reflected off the object and received by the radar subsystem; and
- determining a location and a state estimate of the aircraft from the object height.

12. The method of claim 11, further comprising: receiving an inertial measurement unit (IMU) output of an IMU coupled to the aircraft and determining the location of the aircraft using the IMU output.

13. The method of claim 11, further comprising: with the state estimate, the location, and the object height, updating a running index of an aggregation of state estimates mapped to an aggregation of candidate locations and an aggregation of object heights from historical flights of the aircraft.

14. The method of claim 11, wherein determining the location and the state estimate comprises applying an iterative solver operation to the object height and a running index of an aggregation of state estimates mapped to an aggregation of candidate locations and an aggregation of object heights from historical flights of the aircraft.

15. The method of claim 11, further comprising: based upon at least one of the location and the state estimate, generating a set of instructions for a flight computer of the aircraft, the set of instructions for flight control of the aircraft toward a flight path appropriate for the location.

16. A system for radar-augmented localization, the system comprising:
- a navigation subsystem coupled to an aircraft and comprising a radar subsystem oriented to receive radar signals transmitted toward a ventral portion of the aircraft;
- a data transmission subsystem in communication with the navigation subsystem; and
- a computing system in communication with the data transmission system and comprising machine-readable instructions in non-transitory media for:
  - monitoring an altitude status of an aircraft in flight using an altitude sensor while the radar subsystem of the aircraft is in an inactive mode;
  - in response to the altitude status satisfying a threshold altitude condition, transitioning the radar subsystem of the aircraft from the inactive mode to an active mode of the radar subsystem;
  - while the radar system is in the active mode, emitting, by the radar subsystem, a radio frequency signal in a radio portion of an electromagnetic spectrum and characterizing an object height of an object below the aircraft based on the radio frequency signal reflected off the object and received by the radar subsystem;
  - generating a set of candidate locations of the aircraft from the object height; and
  - determining a location and a state estimate of the aircraft from the object height.

17. The system of claim 16, wherein the navigation subsystem further comprises an inertial measurement unit (IMU) mounted to the aircraft, and a global positioning system (GPS) coupled to the aircraft, the IMU and the GPS communicatively coupled to the computing system and the radar subsystem.

18. The system of claim 17, wherein the computing system further comprises instructions for determining the location of the aircraft from processing the set of candidate locations with an IMU output of the IMU and a GPS output of the GPS.

19. The system of claim 16, wherein the state estimate comprises a position, a velocity, and an orientation of the aircraft.

20. The system of claim 16, further comprising an electronic interface between the computing system and a flight management system of the aircraft, the electronic interface operable in a mode that transmits the set of instructions to the flight management system and controls flight of the aircraft toward the flight path.

* * * * *